(12) United States Patent
Couck

(10) Patent No.: US 8,136,736 B2
(45) Date of Patent: Mar. 20, 2012

(54) SLIM ELECTRONIC DEVICE WITH DETECTOR FOR UNINTENTIONAL ACTIVATION

(75) Inventor: Guy Louis Couck, Denderleeuw (BE)

(73) Assignee: Vasco Data Security, Inc., Oakbrook Terrace, IL (US)

( * ) Notice: Subject to any disclaimer, the term of this patent is extended or adjusted under 35 U.S.C. 154(b) by 466 days.

(21) Appl. No.: 12/330,895

(22) Filed: Dec. 9, 2008

(65) Prior Publication Data

US 2010/0140358 A1    Jun. 10, 2010

(51) Int. Cl.
  *G06K 19/06*   (2006.01)
(52) U.S. Cl. ....................................... 235/492
(58) Field of Classification Search ............ 235/492, 235/379, 487
  See application file for complete search history.

(56) References Cited

U.S. PATENT DOCUMENTS 6,776,332 B2 * 8/2004 Allen et al. ............... 235/380
6,902,116 B2   6/2005 Finkelstein
2008/0169350 A1 * 7/2008 Audebert et al. ......... 235/492
2010/0012473 A1   1/2010 Zieder
2010/0140072 A1   6/2010 Zieder

FOREIGN PATENT DOCUMENTS

WO   WO-2008043896 A2   4/2008
WO   WO-2008129193      10/2008

OTHER PUBLICATIONS

Innovative Card Technologies, Inc., ICT DisplayCard (Product Sheet), retrieved from http://www.incard.com/pdfs/ProductSheet.pdf on Nov. 17, 2008.

* cited by examiner

*Primary Examiner* — Seung Lee
(74) *Attorney, Agent, or Firm* — RatnerPrestia

(57) ABSTRACT

The device of the present invention, having at least one activation button, is further equipped with a sensor adapted to detect conditions under which unintentional triggering of the activation button is likely. The sensor is operatively coupled with the activation button to suspend its effect when the target conditions are being detected. The undesired side-effects of false button activations, including battery drain and activation counter drift, are thus avoided, increasing the device's lifespan and user convenience. In a particular embodiment, the sensor is a decoy button located near the activation button, which serves to de-activate the activation button.

23 Claims, 3 Drawing Sheets

SLIM ELECTRONIC DEVICE WITH DETECTOR FOR UNINTENTIONAL ACTIVATION

TECHNICAL FIELD

The present invention relates to the field of pocket-size electronic devices, including credit card sized devices such as authentication tokens.

BACKGROUND ART

Credit card sized electronic devices are known in the art. Finkelstein [U.S. Pat. No. 6,902,116 B (FINKELSTEIN, ALAN) Jun. 7, 2005] discloses a method for making a financial transaction card with embedded electronic circuitry. The method discloses embedding into a card among other things a battery, a switch or an LED. The switch according to Finkelstein is preferably a pressure sensitive switch that may be activated by finger pressure when the card is held between the thumb and index finger.

A particular type of switch is the pusher-type vault switch disclosed in Zieder [WO 2008/129193 A (ZIEDER, DAVID) Oct. 30, 2008]. This switch is particularly suited for use in flexible smart cards because it is extremely thin. The switch of Zieder is an improvement of the prior art in that it is reliable over multiple uses and gives discernable tactile feedback, i.e. the button "clicks" when it is pressed.

Other types of finger-operated switches are known in the art, including resistive switches, which are triggered by the conductivity of a finger bridging two electrical terminals, or by the change in resistivity caused by compressing a pressure-sensitive material; capacitive switches, which are triggered by a change in capacity caused by the proximity of a finger; temperature-sensitive switches, which are triggered by the temperature change caused by the proximity of a finger.

All these types of switches and their equivalents can be used as buttons in the sense of the present invention.

By adding appropriate elements such as an agent for generating client credentials and a display, a credit card sized authentication token can be obtained, such as the "Display-Card" commercialized by Innovative Card Technologies, Inc. The function of an authentication token is to electronically generate client credentials, also known as one-time passwords, by cryptographically combining a key with at least one of a counter value, a time value, or data entered by the user.

In order to perform authentication, it is essential that the central authentication infrastructure disposes of an equivalent copy of the counter, the time value, or the entered data. Depending on the details of the cryptographic functions used, the central authentication infrastructure either uses this copy to generate a local instance of the client credential for comparison with the received client credential, or it extracts the value of the variable from the received client credential and compares that value with the central copy.

In the case of counter and time based authentication tokens, the central authentication infrastructure will implement a synchronization algorithm to allow successful authentication to occur even if there is a small difference between the variable used by the authentication token and the variable used by the central infrastructure. Such a synchronization algorithm may involve calculating acceptable client credentials corresponding to a range of time or counter values around the time or counter value that is considered correct, or comparing the extracted value to the central copy and assessing whether the difference is within acceptable bounds. These algorithms will lead to successful authentication only if the amount of desynchronization is sufficiently small.

In the case of time-based credential generation, such desynchronization may be due to imperfect clocks. In the case of counter-based credential generation, desynchronization may be due to a number of activations that did not lead to an authentication attempt at the side of the central authentication infrastructure; this could for instance be the effect of a user's repeatedly pressing the authentication token's activation button without submitting the generated credential to the authentication infrastructure.

For an optimal user experience, it is desirable to keep the number of authentication attempts that are unduly rejected, known as false negatives, to a minimum. One class of false negatives which needs to be controlled, is the class of rejections due purely to desynchronization.

At the server side, desynchronization issues can be reduced by making the synchronization algorithm more tolerant, notably by increasing the acceptance range for the counter or time value. However, this comes at the expense of reduced security, because the probability of unduly accepting a forged credential, a so-called false positive, will increase as a consequence. Measures that can be taken to reduce the occurrence of false negatives when using time-based authentication tokens, include using high-precision clocks on both sides.

DISCLOSURE OF THE INVENTION

Technical Problem

A credit card sized device has the advantage that it is small and thin enough to be carried around in a wallet. In that way the user can always have the device at hand, if she so desires, and, in the case of an authentication token, conduct electronically authenticated transactions anywhere she goes.

Buttons on devices that fit into a pocket or a wallet, including credit card sized authentication tokens, tend to undergo false key presses when the device is put under mechanical stress such as bending, twisting or squeezing, or, more generally, exposed to environmental conditions that trigger the activation mechanism of the device. The problem is well known in the area of mobile telephones, where false key-presses may cause the telephone to set up a call unbeknownst to the telephone's owner. The problem is even more pronounced in credit card sized devices, because the slim form of their housing on the one hand makes it natural for the user to put the device in a wallet or pocket, and on the other hand makes the devices susceptible to significant elastic deformation.

Although authentication tokens do not initiate telephone calls, repeated unwanted activation due to false button presses may put an undue burden on the token's battery. The size of the batteries that can be used in a credit card sized device is limited by the size of the device itself, which implies that credit card sized devices have a very limited supply of energy at their disposal. Hence, it is appropriate to avoid any unnecessary energy consumption due to unwanted activation.

Furthermore, in the case of counter-based authentication tokens, false key presses introduce a mismatch between the counter value stored at the central authentication infrastructure and the counter value stored inside the authentication token. This mismatch may render the authentication token inoperable for authentication purposes, if the difference between the two versions of the counter becomes too big to be overcome by the synchronization algorithm.

It is therefore desired to provide a way to avoid activating authentication tokens through false key presses.

A known method to make false activations of pressure-sensitive buttons less likely consists of increasing the pressure required to activate the button in question, a particular method for which is disclosed in Zieder. The disadvantage of this method is that it also renders the normal use of the button less comfortable.

Another known method to make false key presses less likely consists of positioning the button in a depression in the housing such that its upper surface lies in a plane coinciding with or lower than the surface of the housing. One disadvantage of this method is that it also renders the normal use of the button less comfortable. Another disadvantage of this method is that it reduces the travelling distance of the button, which reduces the tactile feedback for the user and which makes it more difficult to construct a highly reliable button. Additionally, this method does not adequately protect against false keypresses caused by twisting or bending of the device. Furthermore, this solution is extremely difficult to implement in very slim devices, such as credit card sized devices.

Yet another known method to make false key presses less likely consists of providing a ridge or protrusion in the housing surrounding the button. One disadvantage of this method is that it also renders the normal use of the button less comfortable. Additionally, this method does not adequately protect against false keypresses caused by twisting or bending of the device. Another disadvantage of this method is that it is difficult to implement when there are constraints on the overall thickness of the device, as is the case in credit card sized devices.

In the context of mobile telephones, the unintentional dialling problem is typically resolved by providing the telephone with a "locked" state, in which the device is not responsive to any keypresses other than a predefined and documented unlocking combination. This particular solution is not practical in credit card sized authentication tokens. Firstly, the authentication token would have to have a sufficiently great number of keys to support an unlocking combination that is unlikely to be entered unintentionally through false key presses. Secondly, the authentication token would continuously spend battery power—which is a scarce resource—to process all key presses, intentional or unintentional, in order to detect the entering of the unlocking combination.

Technical Solution

The present invention is based on the insight that the undesired effects of false key presses can be avoided if the false key presses can be identified as such, and if the normal effect of a key press can be suspended in those cases. More specifically, as false key presses occurring in a small, flexible device are often due to unintentional elastic deformation of the device, such as bending or twisting, a proper detection of such deformation may serve to identify unintentional key presses. Likewise, as false key presses are often generated by the application of pressure over the whole of the device, a proper detection of such pressure may serve to identify unintentional key presses. To this end, the device having at least one activation button, e.g. a credit card sized authentication token, may be further equipped with one or more of a tension sensor, a torsion sensor, and a pressure sensor, which is operatively coupled with the at least one activation button to suspend its effect when suspected unintentional mechanical stress is being detected.

Such a sensor may comprise a strain gauge as known in the art. Strain gauges are capable of transforming a variable amount of mechanical stress into a variable electrical resistance, relying on the physical fact that a conductor's resistivity is dependent on its geometry. Strain gauges may be implemented as a semiconductor component, known as a piezoresistor. Although a strain gauge is designed to detect elongation or compression only, the person skilled in the art will understand that a set of strain gauges judiciously located at several places along an object will produce sufficient information about local strain levels to detect global twisting or bending of the object.

Such a sensor may also comprise a judiciously designed capacitor. The capacitance of a capacitor depends inter alia on the distance between its plates. If the dielectric between the plates is sufficiently elastic, a variable amount of pressure applied to the outside of the plates will result in a variable capacitance. In this way, a pressure sensor is obtained.

The stress level and associated sensor output that are considered indicative of conditions in which false triggering of the activation button may occur can be determined empirically during the product development phase.

The present invention is further based on the insight that any amount of mechanical stress that would lead to unintentional triggering of the activation button, might also lead to the activation of an special-purpose, additional button, hereinafter termed a "decoy button", and that hence, a decoy button may serve as a specific implementation of the stress sensors introduced above.

Thus, the effect of false key presses can be reduced by adding a decoy button to the device. The decoy button is a button located near the activation button, which serves to inhibit the effect of the activation button.

Conceptually, the decoy button may be implemented as a switch that negates the effect of the activation button. Hence, if the activation button operates by closing an electrical circuit when pressed, the decoy button is made to open that circuit. Conversely, if the activation button operates by interrupting a circuit when pressed, the decoy button is made to bypass that circuit.

The skilled persons understand that the same effect may inter alia be obtained by providing the state of the activation button and the state of the decoy button to an appropriate logical circuit, to determine whether a triggering of the activation button should be given any effect, given the state of the decoy button. Such a logical circuit may be implemented in a processor with adequate software.

The effect is that the activation button will only be operative if it is pressed without a simultaneous depression of the decoy button. It may be expected that a typical false key press would involve the depression of both the decoy button and the activation button, which, in the scheme of the present invention, would have no effect. When a user effectuates an intentional key press, she would do this by pressing only the activation button, which would produce the expected effect. The decoy button and the activation button are preferably designed in such a way that it is unlikely for a user to unintentionally press the decoy button when she presses the activation button.

The decoy button is preferably more sensitive to outside pressure than the activation button, to ensure that the decoy button is triggered first when a uniform pressure is exerted over the whole of the device.

The decoy button is preferably triggered at a greater distance from the rear plane of the device than the activation button, to ensure that the decoy button is triggered first when the device is squeezed.

If the user interface of the device consists of multiple buttons, one or more decoy buttons may be used to protect the operation of these interface buttons. In an exemplary embodiment, one of the buttons serves as a general on/off switch for the entire device and is protected by a dedicated decoy button.

If the user interface of the device consists of multiple buttons, these buttons may be organized to form a keypad. If the device is intended for use as a pocket calculator, such a keypad would comprise all numerals and selected mathematical operators. The presence of a keypad on an authentication token allows security paradigms that require the user to enter a correct PIN or password in order to generate a client credential, whereby the authentication token either refuses to operate when an incorrect PIN or password is provided, or cryptographically combines the submitted PIN or password into the generated client credential, leading to rejection by the central authentication infrastructure if the submitted PIN or password is incorrect. The presence of a keypad also allows the user to enter data, such as transaction data or a challenge provided by a service provider, which may be cryptographically combined into the generated client credential, such that the generated client credential can serve as a digital signature over the submitted data.

An improvement that can be applied independently of the invention as described above, consists of a variation of the well-known "raised ridge" to protect individual buttons from false key presses. In credit card sized devices, a classical raised ridge is difficult to implement, and may lead to a total device thickness that exceeds the applicable standards for credit cards. Typically, the only deviation of a completely flat surface that is found on credit cards, is the embossing of characters indicating the card holder's name and the card number and expiry date. The improvement is based on the insight that the embossing technique may be applied to provide a ridge around a button, while remaining within the thickness bounds imposed by credit card size standards. In order not to sever any bonds or wires connecting to the button in question during the embossing process, the embossed ridge is preferably not in a fully closed shape. Preferred shapes include a U-shape, or a pair of parentheses or crescents surrounding the button.

Advantageous Effects

The apparatus of the present invention has the advantage that false activations can be avoided. This avoids unnecessary battery drain, thus increasing the lifetime of the apparatus.

Furthermore, the present invention avoids unintentional increasing of the event counter in an authentication token according to the present invention, which could cause desynchronization between the authentication token and the associated counter record in the central authentication database, thus reducing the risk of false negatives due to desynchronization in the authentication process.

BRIEF DESCRIPTION OF THE DRAWINGS

The foregoing and other features and advantages of the invention will be apparent from the following, more particular description of several embodiments of the invention, as illustrated in the accompanying drawings.

Across the different figures, the same numerals are used to refer to the same or equivalent elements of the present invention.

MODES(S) FOR CARRYING OUT THE INVENTION

Figure 1:
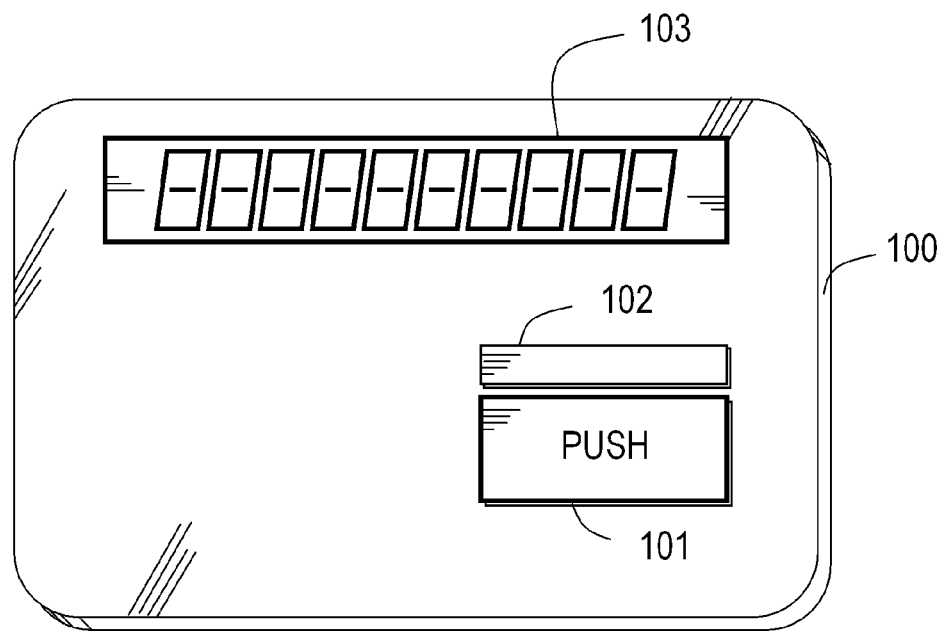
FIG. 1 illustrates an authentication token 100, comprising a display 103, a single activation button 101 and a single decoy button 102.
Figure 2A:
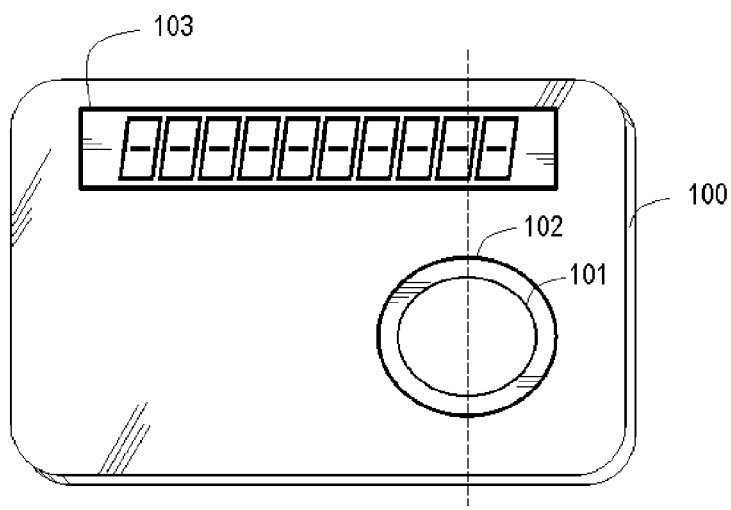
FIG. 2a illustrates another authentication token 100, comprising a display 103, a single circular activation button 101 and a single annular decoy button 102.
Figure 2B:
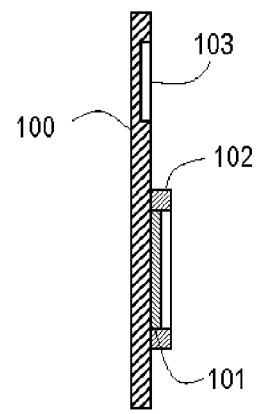
FIG. 2b shows a cross-section of the authentication token of FIG. 2a, corresponding to the plane indicated by the vertical dashed line in FIG. 2a. More specifically, FIG. 2b clearly shows the different levels of protrusion (exaggerated) of activation button 101 and decoy button 102. The internals of the authentication token are not shown, to avoid undue complication of the figure.
Figure 3:
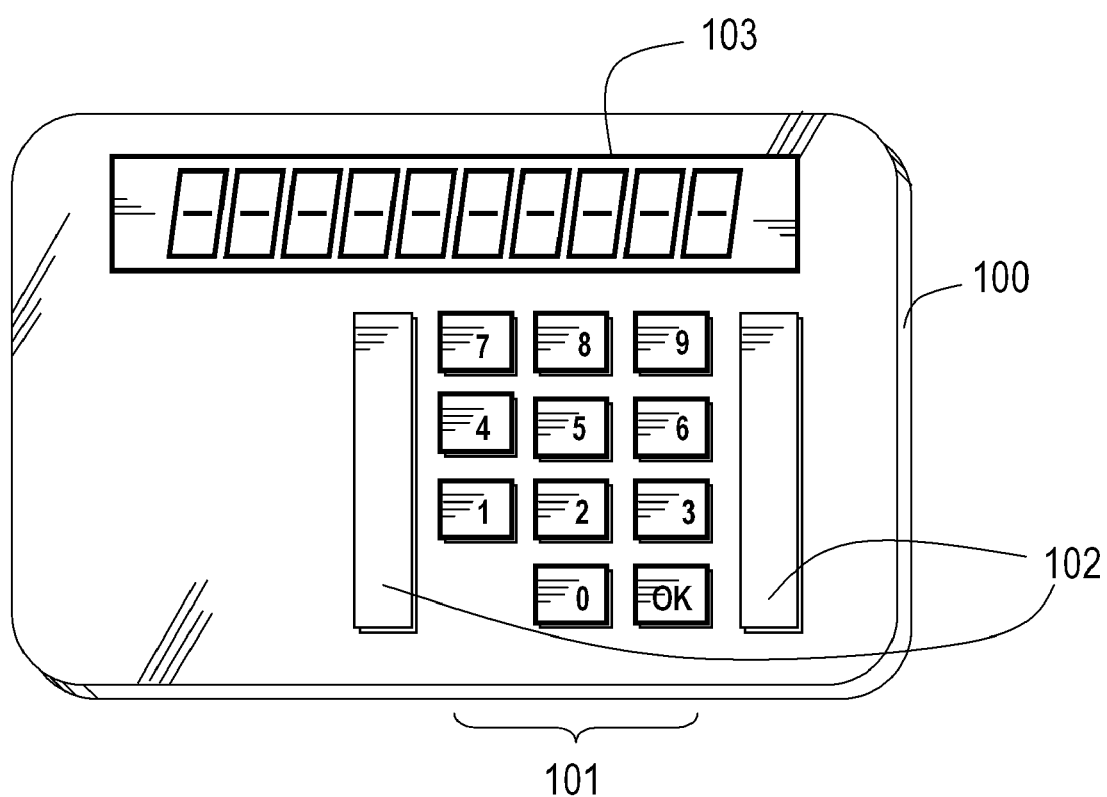
FIG. 3 illustrates an authentication token 100, comprising a display 103, multiple activation buttons 101, organized here as a numerical keypad, and multiple decoy buttons 102, organized here as two vertical bars.
Figure 4:
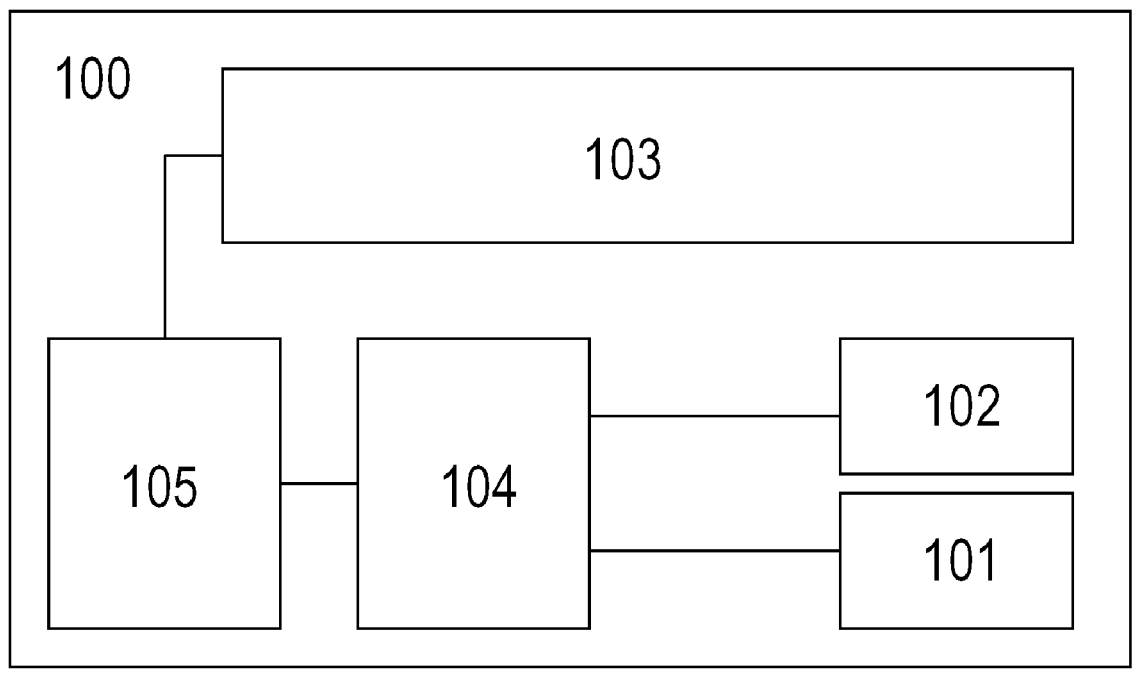
FIG. 4 schematically illustrates a slim electronic apparatus 100 according to the present invention, comprising an activation button 101, a detector 102 for detecting unintentional activation conditions, an output 103, an agent 104 for performing at least one operation, and a power source 105.

In a general embodiment, the slim electronic apparatus 100 of the present invention comprises a power source 105, an agent 104 for performing at least one operation, an activation button 101 for initiating said at least one operation by said agent, and a detector 102 adapted to detect unintentional activation conditions. Said detector may inhibit said initiating of said at least one operation if unintentional activation conditions are detected. The result of the operation performed by the agent 104 may be communicated to an end user via an output 103.

The agent 104 for performing at least one operation may be implemented as a dedicated hardware component such as an Application-Specific Integrated Circuit (ASIC), or adequately configured configurable hardware such as a Field-Programmable Gate Array (FPGA). Alternatively, it may be implemented as a general-purpose microprocessor with adequate software.

In one embodiment of the apparatus of the present invention, said detector is adapted to detect an externally applied influence in a spatial region beyond the direct proximity of said activation button.

In one embodiment of the apparatus of the present invention, said agent is adapted to generate client credentials. The agent may comprise a cryptographic key or other secret data element. The agent may comprise a clock and/or a counter.

In another embodiment of the apparatus of the present invention, said agent is adapted to perform arithmetic operations.

In yet another embodiment of the apparatus of the present invention, said detector comprises a sensing element capable of detecting torsion, and wherein said unintentional activation conditions comprise a certain minimum amount of torsion.

In a further embodiment of the apparatus of the present invention, said detector comprises a sensing element capable of detecting pressure, and wherein said unintentional activation conditions comprise a certain minimum amount of pressure.

In still a further embodiment of the apparatus of the present invention, said detector comprises a sensing element capable of detecting elongation, and wherein said unintentional activation conditions comprise a certain minimum amount of elongation.

In another embodiment of the apparatus of the present invention, said detector comprises a decoy button located in proximity to said activation button. In one particular embodiment of the apparatus of the present invention, the magnitude of the external stimulus required to trigger said activation button is greater than the magnitude required to operate said decoy button. In a more particular embodiment of the apparatus of the present invention, said buttons are pressure-sensitive, and the force required to operate said activation button is greater than the force required to operate said decoy button. In another particular embodiment of the apparatus of the present invention, said decoy button protrudes further from said apparatus than said activation button. In yet another particular embodiment of the apparatus of the present invention, said decoy button has an annular shape, surrounding said activation button.

In another embodiment of the apparatus of the present invention, said power source comprises a battery.

In another embodiment of the present invention, the apparatus has ISO 7816 compliant dimensions.

While various embodiments of the present invention have been described above, it should be understood that they have been presented by way of example only, and not limitation. Thus, the breadth and scope of the present invention should not be limited by any of the above described exemplary embodiments but should be defined only in accordance with the following claims and their equivalents.

The invention claimed is:

1. A credit-card sized electronic apparatus comprising:
   a power source,
   a circuit for performing at least one operation comprising cryptographic or arithmetic operations,
   an activation button for initiating said at least one operation by said circuit,
   and a detector adapted to detect an external mechanical stress that is applied to a spatial region of the credit-card sized electronic apparatus beyond the activation button.

2. The apparatus of claim 1, wherein said detector inhibits said initiating of said at least one operation if said external mechanical stress is detected.

3. The apparatus of claim 1, wherein said detector is adapted to detect said external mechanical stress by detecting deformation of the apparatus.

4. The apparatus of claim 3 wherein said detector comprises a sensing element capable of detecting torsion, and wherein said deformation comprises an amount of torsion that exceeds a predefined level of torsion.

5. The apparatus of claim 3 wherein said detector comprises a sensing element capable of detecting elongation, and wherein said deformation comprises an amount of elongation that exceeds a predefined level of elongation.

6. The apparatus of claim 3 wherein said detector comprises a sensing element capable of detecting bending of at least a part of the apparatus, and wherein said deformation comprises an amount of bending that exceeds a predefined level of bending.

7. The apparatus of claim 1, wherein said circuit is adapted to generate client credentials.

8. The apparatus of claim 7 further comprising a secret key, and wherein said generation of client credentials comprises cryptographically combining said secret key with at least one of a time value, a counter value, or a data value entered by a user.

9. The apparatus of claim 8 comprising a clock for providing the time value.

10. The apparatus of claim 8 comprising a counter for providing the counter value.

11. The apparatus of claim 8 comprising multiple buttons for providing the data value entered by the user.

12. The apparatus of claim 1, wherein said circuit is adapted to perform arithmetic operations.

13. The apparatus of claim 1 wherein said detector comprises a sensing element capable of detecting pressure, and wherein said external mechanical stress comprises an amount of pressure that exceeds a predefined level of pressure.

14. The apparatus of claim 1 wherein said detector comprises a decoy button located in proximity to said activation button.

15. The apparatus of claim 14, wherein a magnitude of an external stimulus required to trigger said activation button is greater than another magnitude of another external stimulus required to operate said decoy button.

16. The apparatus of claim 14, wherein said activation button and said decoy button are pressure-sensitive buttons and wherein a pressure force required to operate said activation button is greater than another pressure force required to operate said decoy button.

17. The apparatus of claim 14, wherein said decoy button protrudes further from said apparatus than said activation button.

18. The apparatus of claim 14, wherein said decoy button has an annular shape, surrounding said activation button.

19. The apparatus of claim 1, wherein said power source comprises a battery.

20. The apparatus of claim 1, having ISO 7816 compliant dimensions.

21. The apparatus of claim 1 further comprising an output mechanism for outputting to the user the result of the operation.

22. The apparatus of claim 21 wherein said output mechanism further comprises a display.

23. A credit-card sized authentication token comprising:
   a battery;
   at least one of a clock for providing a time value, a counter for providing a counter value or multiple buttons for allowing a user to enter data;
   a circuit comprising a secret data element, said circuit adapted for performing at least one operation, said operation comprising generating a client credential by cryptographically combining said secret data element with at least one of said time value, said counter value, or said data entered by the user;
   a display for displaying said client credential to the user;
   a pressure sensitive activation button for initiating said at least one operation by said circuit; and
   a detector adapted to detect an external mechanical stress that is applied to a spatial region of the credit-card sized authentication token beyond the activation button,
   wherein the authentication token is adapted to inhibit said initiating of said at least one operation if said external mechanical stress is detected by said detector.

* * * * *